US007013382B1

(12) United States Patent  (10) Patent No.: US 7,013,382 B1
Nguyen  (45) Date of Patent: Mar. 14, 2006

(54) MECHANISM AND METHOD FOR REDUCING PIPELINE STALLS BETWEEN NESTED CALLS AND DIGITAL SIGNAL PROCESSOR INCORPORATING THE SAME

(75) Inventor: Hung T. Nguyen, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 458 days.

(21) Appl. No.: 10/002,817

(22) Filed: Nov. 2, 2001

(51) Int. Cl.
  *G06F 9/30* (2006.01)
(52) U.S. Cl. .................................. 712/219; 712/208
(58) Field of Classification Search ................ 712/219, 712/24, 35, 214, 215, 208
  See application file for complete search history.

(56) References Cited

U.S. PATENT DOCUMENTS

| | | | | |
|---|---|---|---|---|
| 4,498,136 A | * | 2/1985 | Sproul, III ................. | 710/262 |
| 5,136,696 A | * | 8/1992 | Beckwith et al. ........... | 712/240 |
| 5,594,864 A | * | 1/1997 | Trauben ...................... | 714/39 |
| 5,832,292 A | * | 11/1998 | Nguyen et al. ............... | 712/23 |
| 6,167,509 A | * | 12/2000 | Sites et al. ................... | 712/237 |
| 2002/0078326 A1 | * | 6/2002 | Roth et al. .................... | 712/218 |

* cited by examiner

*Primary Examiner*—Henry W. H. Tsai

(74) *Attorney, Agent, or Firm*—Hitt Gaines PC

(57) ABSTRACT

For use in a wide-issue pipelined processor, a mechanism and method for reducing pipeline stalls between nested calls and supporting early prefetching of instructions in nested subroutines and a digital signal processor (DSP) incorporating the mechanism or the method. In one embodiment, the mechanism includes: (1) a program counter (PC) generator that generates return PC values for call instructions in a pipeline of the processor and (2) return PC storage, coupled to the PC generator and located in an execution core of said processor, that stores the return PC values and makes ones of the return PC values available to a PC of the processor upon execution of corresponding return instructions.

22 Claims, 4 Drawing Sheets

MECHANISM AND METHOD FOR REDUCING PIPELINE STALLS BETWEEN NESTED CALLS AND DIGITAL SIGNAL PROCESSOR INCORPORATING THE SAME

TECHNICAL FIELD OF THE INVENTION

The present invention is directed, in general, to digital signal processors (DSPs) and, more specifically, to a mechanism and method for reducing pipeline stalls between nested calls and a DSP that incorporates the mechanism or the method.

BACKGROUND OF THE INVENTION

Over the last several years, DSPs have become an important tool, particularly in the real-time modification of signal streams. They have found use in all manner of electronic devices and will continue to grow in power and popularity.

As time has passed, greater performance has been demanded of DSPs. In most cases, performance increases are realized by increases in speed. One approach to improve DSP performance is to increase the rate of the clock that drives the DSP. As the clock rate increases, however, the DSP's power consumption and temperature also increase. Increased power consumption is expensive, and intolerable in battery-powered applications. Further, high circuit temperatures may damage the DSP. The DSP clock rate may not increase beyond a threshold physical speed at which signals may traverse the DSP. Simply stated, there is a practical maximum to the clock rate that is acceptable to conventional DSPs.

An alternate approach to improve DSP performance is to increase the number of instructions executed per clock cycle by the DSP ("DSP throughput"). One technique for increasing DSP throughput is pipelining, which calls for the DSP to be divided into separate processing stages (collectively termed a "pipeline")). Instructions are processed in an "assembly line" fashion in the processing stages. Each processing stage is optimized to perform a particular processing function, thereby causing the DSP as a whole to become faster.

"Superpipelining" extends the pipelining concept further by allowing the simultaneous processing of multiple instructions in the pipeline. Consider, as an example, a DSP in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall DSP speed is "superscalar" processing. Superscalar processing calls for multiple instructions to be processed per clock cycle. Assuming that instructions are independent of one another (the execution of each instruction does not depend upon the execution of any other instruction), DSP throughput is increased in proportion to the number of instructions processed per clock cycle ("degree of scalability"). If, for example, a particular DSP architecture is superscalar to degree three (i.e., three instructions are processed during each clock cycle), the instruction throughput of the DSP is theoretically tripled.

These techniques are not mutually exclusive; DSPs may be both superpipelined and superscalar. However, operation of such DSPs in practice is often far from ideal, as instructions tend to depend upon one another and are also often not executed efficiently within the pipeline stages. In actual operation, instructions often require varying amounts of DSP resources, creating interruptions ("bubbles" or "stalls") in the flow of instructions through the pipeline. Consequently, while superpipelining and superscalar techniques do increase throughput, the actual throughput of the DSP ultimately depends upon the particular instructions processed during a given period of time and the particular implementation of the DSP's architecture.

The speed at which a DSP can perform a desired task is also a function of the number of instructions required to code the task. A DSP may require one or many clock cycles to execute a particular instruction. Thus, in order to enhance the speed at which a DSP can perform a desired task, both the number of instructions used to code the task as well as the number of clock cycles required to execute each instruction should be minimized.

It has long been a preferred practice to break computer programs down into separate routines and subroutines. From a conceptual standpoint, program functions are compartmentalized and the structural integrity and comprehensibility of the program as a whole increased. From a practical standpoint, subroutines can be reused without duplication, sometimes dramatically decreasing the overall size of the program.

Subroutines are invoked by a process termed "calling." A routine may therefore "call" a subroutine to have it perform its particular function; when the subroutine has finished, it "returns" back to the routine that called it. It is apparent that a hierarchy of routines and subroutines could be advantageous for certain kinds of programs. For example, a main routine could call a first subroutine, which itself could call a second subroutine, and so on. This hierarchy of multiple subroutine levels is called "nested subroutines."

A DSP, and a processor in general, handles subroutines by manipulating its program counters (PCS). A program counter simply contains the address of the instruction that is being executed. To call a subroutine, the contents of the PC is stored in a separate memory location, the address of the first instruction in the subroutine is loaded into the PC, and the subroutine is executed. When time to return, the original contents of the PC are retrieved from the separate memory location and incremented to point to the next instruction in the routine that called the subroutine.

Nested subroutines are handled by establishing a last-in, first out (LIFO) buffer, called a "stack," in memory. Each time a subroutine is called, the contents of the PC are "pushed" into the stack. Each time a subroutine ends (a return), the contents that were earlier pushed into the stack are "popped" from the stack and reloaded into the PC.

Unfortunately, pushing into, and popping from, a stack require accesses to memory, which are time-consuming. They are also power-consuming, which is highly disadvantageous in a battery- powered environment. It is therefore advantageous to avoid these memory accesses whenever possible.

It is further advantageous to provide a mechanism to support early execution of nested call instructions thereby to allow prefetching of instructions in nested subroutines. Prefetching at least some of the instructions in nested subroutines would avoid undue latency that would otherwise be encountered in the absence of prefetching.

What is needed in the art is a way to support nested subroutines without having to resort to memory accesses. What is further needed in the art is a way to support prefetching and early execution of nested subroutine calls in a pipelined processor architecture.

SUMMARY OF THE INVENTION

To address the above-discussed deficiencies of the prior art, the present invention provides, for use in a wide-issue pipelined processor, a mechanism and method for reducing pipeline stalls between nested calls and a DSP incorporating the mechanism or the method. In one embodiment, the mechanism includes: (1) a PC generator that generates return PC values for call instructions in a pipeline of the processor and (2) return PC storage, coupled to the PC generator and located in an execution core of said processor, that stores the return PC values and makes ones of the return PC values available to a PC of the processor upon execution of corresponding return instructions.

The present invention therefore introduces the broad concept of supporting nested calls by generating multiple return PC values ahead of time and storing them in the processor core itself until return instructions are executed. Because they have been generated ahead of time and kept in the processor core, the return PC values are ready for immediate use, thereby avoiding any delay that would occur were they required to be retrieved from a stack in memory. Calls can also be executed early, even before they are grouped. Such early execution allows instructions in the subroutines to be prefetched to advantage.

In one embodiment of the present invention, the PC generator is associated with an instruction issue unit of the processor. Of course, the PC generator could be associated with other functional units of the processor, as may be appropriate in a given application.

In one embodiment of the present invention, the PC generator generates each of the return PC values in a single clock cycle. Of course, a longer time remains within the broad scope of the present invention.

In one embodiment of the present invention, a return PC queue of the return PC storage has at least as many slots as a number of call instructions a fetch/decode stage of the pipeline can decode prior to grouping. This guarantees that the return PC queue will not overflow and lose a return PC value.

In one embodiment of the present invention, the return PC values move through registers of the return PC storage as corresponding ones of the return instructions move through stages in the pipeline. In an embodiment to be illustrated and described, the return PC value tracks the corresponding call instruction, simplifying the logic required to extract the proper return PC value from the return PC storage upon execution of a return instruction.

In one embodiment of the present invention, the return PC storage makes the ones of the return PC values available to a PC of the processor as the corresponding return instructions are in an execution stage of the pipeline. Those skilled in the pertinent art will understand, however, that execution could occur in any stage of a given pipeline.

In one embodiment of the present invention, the call instruction is executed in a fetch/decode stage of the pipeline. This early execution of call (and, in an embodiment to be illustrated and described, return) instructions allows efficient prefetching of instructions in nested subroutines.

In one embodiment of the present invention, the processor is a digital signal processor. Those skilled in the pertinent art will understand, however, that the principles of the present invention can find application in processors of many types, including non-DSP, general purpose microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
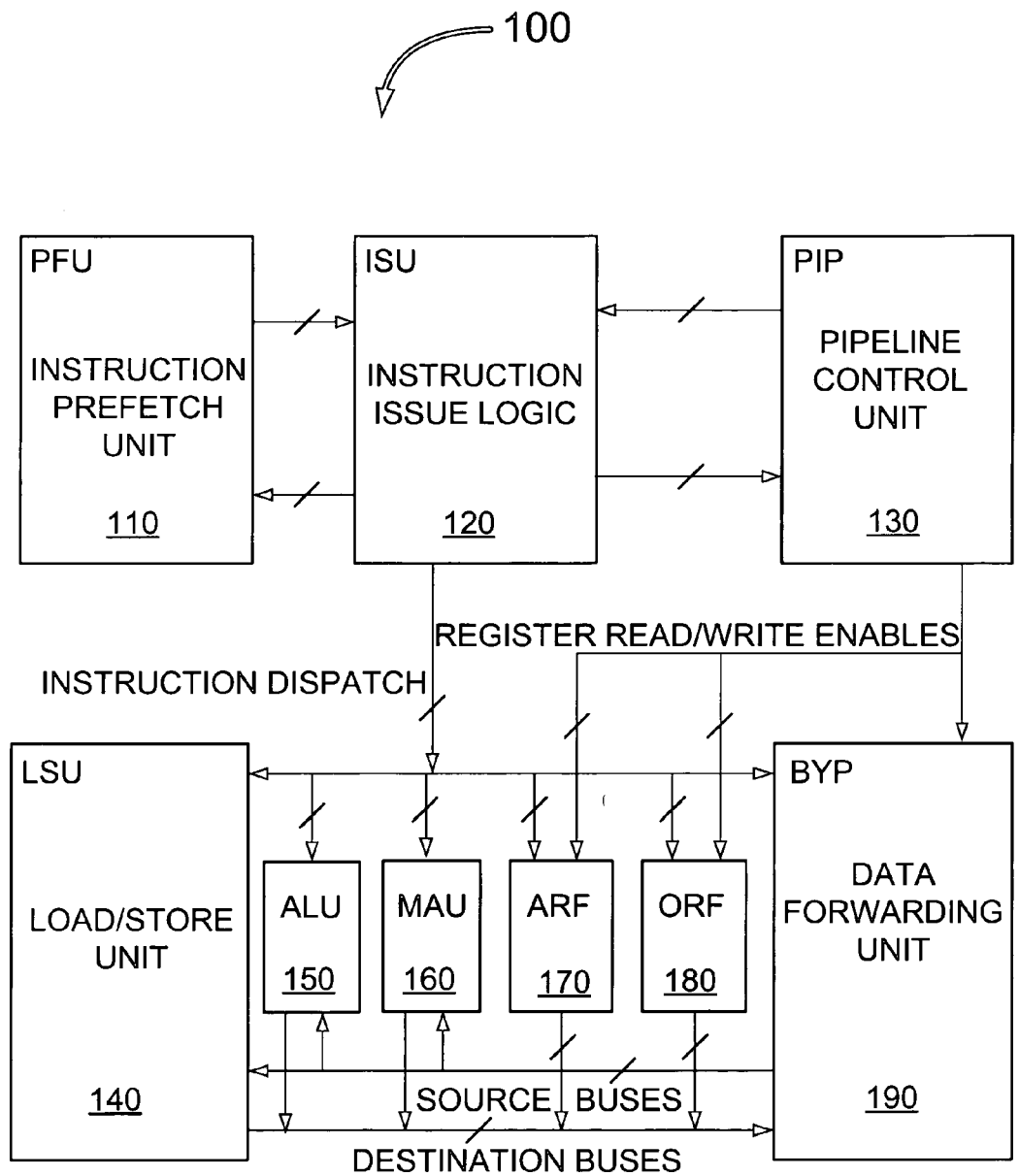
FIG. 1 illustrates an exemplary DSP which may form an environment within which a mechanism and method for reducing pipeline stalls between nested calls constructed according to the principles of the present invention can operate.

Referring initially to FIG. 1, illustrated is an exemplary DSP, generally designated 100, which may form an environment within which a mechanism and method for reducing pipeline stalls between nested calls constructed according to the principles of the present invention can operate. Those skilled in the pertinent art should understand that the mechanism and method of the present invention may be applied to advantage in other conventional or later-discovered DSP or general-purpose, non-DSP, processor architectures.

The DSP 100 contains an instruction prefetch unit (PFU) 110. The PFU 110 is responsible for anticipating (sometimes guessing) and prefetching from memory the instructions that the DSP 100 will need to execute in the future. The PFU 110 allows the DSP 100 to operate faster, because fetching instructions from memory involves some delay. If the fetching can be done ahead of time and while the DSP 100 is executing other instructions, that delay does not prejudice the speed of the DSP 100.

The DSP 100 further contains instruction issue logic (ISU) 120. The ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., arithmetic logic unit, multiply-accumulate unit and address and operand register files) and retiring instructions after they have been executed or are otherwise no longer of use. Accordingly, the ISU 120 cooperates with the PFU 110 to receive prefetched instructions for issuance.

In a normal operating environment, the DSP 100 processes a stream of data (such as voice, audio or video), often in real- time. The DSP 100 is adapted to receive the data stream into a pipeline (detailed in Table 1 below and comprising eight stages) The pipeline is under control of a pipeline control unit (PIP) 130. The PIP 130 is responsible for moving the data stream through the pipeline and for ensuring that the data stream is operated on properly. Accordingly, the PIP 130 coordinates with the ISU 120 to ensure that the issuance of instructions is synchronized with the operation of the pipeline, that data serving as operands for the instructions are loaded and stored in proper place and that the necessary processing resources are available when required.

TABLE 1

Pipeline Stages

| Stage | Employed to |
| --- | --- |
| Fetch/Decode (F/D) | fetch and decode instructions speculatively execute call instructions and store RPC into RPC FIFO queue (terms defined below) Prefetch instructions in subroutines if not already in the instruction cache |
| Group (GR) | check grouping and dependency rules group valid instructions execute call instructions execute return instructions |
| Read (RD) | read operands for address generation and control register update dispatch valid instructions to all functional units execute move immediate to control register instructions |
| Address Generation (AG) | calculate addresses for all loads and stores execute bit operations on control registers |
| Memory Read 0 (M0) | send registered address and request to the memory subsystem. |
| Memory Read 1 (M1) | load data from the memory subsystem register return data in the ORF (term defined below) read operands for execution from the ORF. |
| Execute (EX) | execute remaining instructions write results to the ORF or send results to BYP (term defined below) |
| Writeback (WB) | register results in the ORF or the ARF (term defined below) |

A load/store unit (LSU) 140 is coupled to, and under the control of, the PIP 130. The LSU 140 is responsible for retrieving the data that serves as operands for the instructions from memory (a process called "loading") and saving that data back to the memory as appropriate (a process called "storing"). Accordingly, though FIG. 1 does not show such, the LSU 140 is coupled to a data memory unit, which manages data memory to load and store data as directed by the LSU 140. The DSP 100 may be capable of supporting self-modifying code (code that changes during its own execution). If so, the LSU 140 is also responsible for loading and storing instructions making up that code as though the instructions were data.

As mentioned above, the DSP 100 contains various processing resources that can be brought to bear in the execution of instructions and the modification of the data in the data stream. An arithmetic logic unit (ALU) 150 performs general mathematical and logical operations (such as addition, subtraction, shifting, rotating and Boolean operations) and is coupled to, and under control of, both the ISU 120 and the PIP 130. A multiply- accumulate unit (MAC) and another ALU are provided in a MAC/accumulate unit (MAU) 160 to perform multiplication and division calculations and calculations that are substantially based on multiplication or division and, as the ALU 150, is coupled to, and under control of, both the ISU 120 and the PIP 130.

The DSP 100 contains very fast, but small, memory units used to hold information needed by instructions executing in the various stages of the pipeline. That memory is divided into individually designated locations called "registers." Because the various stages of the pipeline employ the registers in their instruction-processing, the registers are directly accessible by the stages. The DSP 100 specifically contains an address register file (ARF) 170 and an operand register file (ORF) 180. As the names imply, the ARF 170 holds addresses (typically corresponding to memory locations containing data used by the stages) and the ORF 180 holds operands (data that can be directly used without having to retrieve it from further memory locations).

Certain data may be required for more than one instruction. For example, the results of one calculation may be critical to a later calculation. Accordingly, a data forwarding unit (BYP) 190 ensures that results of earlier data processing in the pipeline are available for subsequent processing without unnecessary delay.

Though not illustrated in FIG. 1, the DSP 100 has an overall memory architecture that is typical of conventional DSPs and microprocessors. That is, its registers are fast but small; its instruction and date caches (contained respectively in the PFU 110 and the LSU 140) are larger, but still inadequate to hold more than a handful of instructions or data; its local instruction memory and data memory are larger still, but may be inadequate to hold an entire program or all of its data. An external memory (not located within the DSP 100 itself) is employed to hold any excess instructions or data.

It should be noted in this context that the illustrated DSP 100 is of a Harvard architecture. Its instruction and data memories are separate, controlled by separate controllers and separately addressed by the PFU 110 and the LSU 140, respectively. Those skilled in the pertinent art should understand, however, that the principles of the present invention are as easily applied to a von Neumann architecture (one in which instruction and data memories are merged into a single logical entity).

Figure 2:
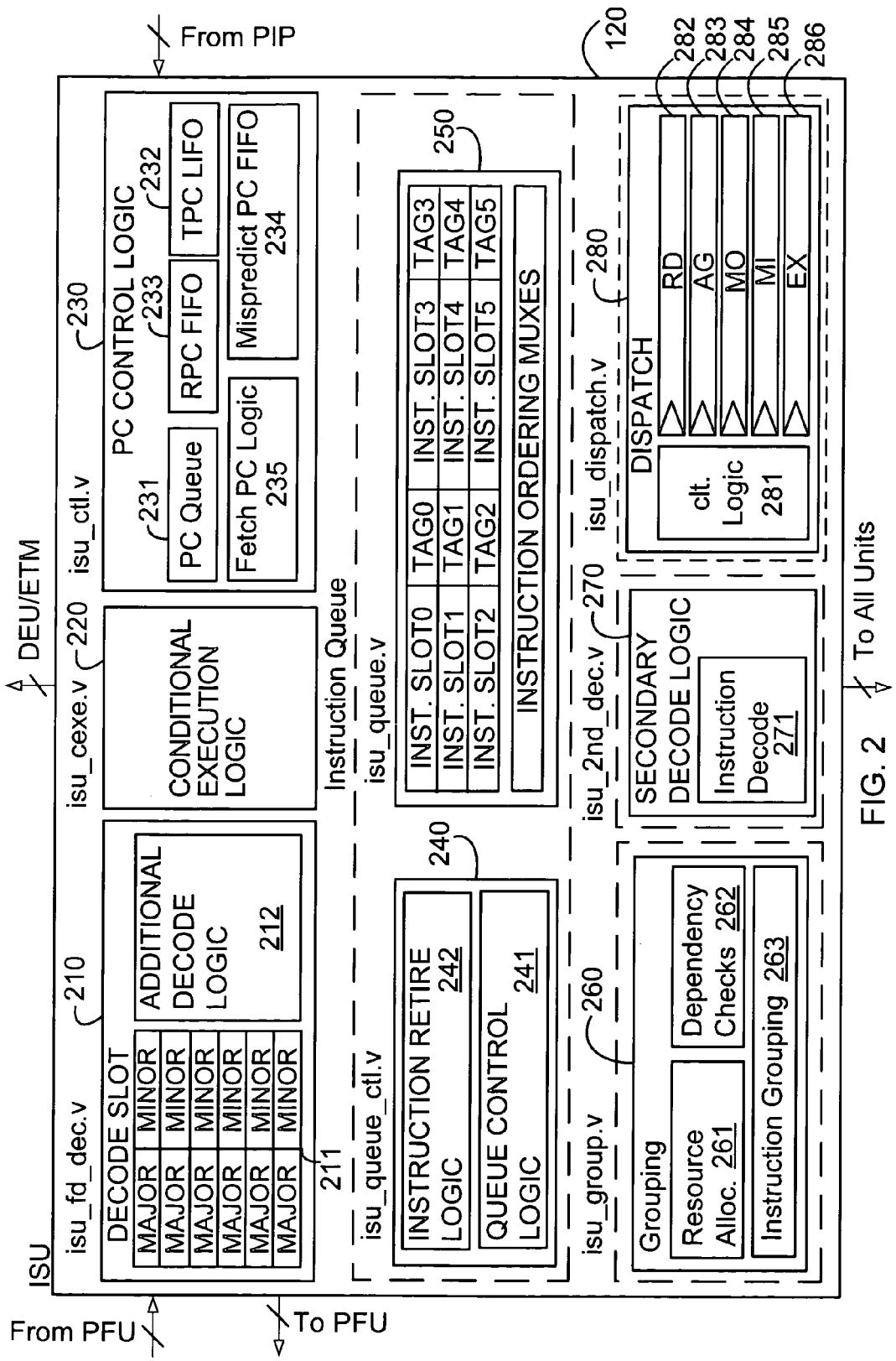
FIG. 2 illustrates in greater detail an instruction issue unit of the DSP of FIG. 1.

Turning now to FIG. 2, illustrated in greater detail is the ISU 120 of FIG. 1. Recall that the ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., the ALU 150, the MAU 160, the ARF 170 and the ORF 180) and retiring instructions after they have been executed, invalidated or are otherwise no longer of use.

The illustrated ISU 120 is capable of decoding and issuing up to six instructions in order. To perform this function, the ISU 120 receives partially decoded instructions from an instruction queue within the PFU 110 of FIG. 1 and communicates with the F/D, GR, RD, AG, M0 and M1 stages of the pipeline to issue the instructions as appropriate.

The ISU 120 contains an instruction decode block isu_dec 210; a conditional execution logic block isu_cexe 220; a program counter (PC) controller isu_ctl 230; an instruction queue (containing an instruction queue control block isu_queue_ctl 240 and an instruction queue block isu_queue 250); an instruction grouping block isu_group 260; a secondary decode logic block isu_2nd_dec 270; and a dispatch logic block isu_dispatch 280.

The PFU 110 sends up to six partially-decoded and aligned instructions to isu_fd_dec 210. These instructions are stored in a six slot queue 211. Each slot in the queue 211 consists of major and minor opcode decoders and additional decode logic 212. The instructions are fully decoded in the F/D stage of the pipeline. The instructions in the queue 211 are only replaced (retired) from the queue 211 after having been successfully grouped in the GR stage.

The contents of the queue 211 are sent to grouping logic in the GR stage of the pipeline for hazard detection. Instruction grouping logic 263 within isu_group 260 governs the GR stage. The instruction grouping logic 263 embodies a predefined set of rules, implemented in hardware (including logic 262 devoted to performing dependency checks, e.g., write-after-write, read-after-write and write-after-read), that determines which instructions can be grouped together for execution in the same clock cycle. The grouping process is important to the operation and overall performance of the DSP 100, because instruction opcodes, instruction valid signals, operand register reads and relevant signals are dispatched to appropriate functional units in subsequent pipeline stages based upon its outcome. Resource allocation logic 261 assists in the dispatch of this information.

The conditional execution logic block isu_cexe 220 is responsible for identifying conditional execution (cexe) instructions and tagging the beginning and ending instructions of the cexe blocks that they define in the queue 211. When instructions in a cexe block are provided to the GR stage, they are specially tagged to ensure that the instruction grouping logic 263 groups them for optimal execution.

The PC controller isu_ctl 230 includes a PC register, a trap PC (TPC) register, activated when an interrupt is asserted, and a return PC (RPC) register, activated when a call occurs. These registers have associated queues: a PC queue 231, a TPC last- in, first-out queue 232 and an RPC first-in, first-out (FIFO) queue 233. isu_ctl 230 also contains logic to update these registers and queues 231, 232, 233. A mispredict PC register, a mispredict first-in, first-out queue 234 and associated logic keep track of mispredictions. Fetch PC logic 235 controls the prefetching of instructions and, accordingly, the PFU 110 of FIG. 1. Subsequent PCS are calculated based on the number of the instructions grouped in the GR stage and the current state of the DSP 100. The state of the DSP 100 is affected by interrupts, branch mispredictions and return instructions.

The instruction queue (containing isu_queue_ctl 240 and isu_queue 250) actually contains the instructions which are queued for dispatch to the pipeline. The queue itself, isu_queue 250, has six 91-bit entries and input and output multiplexers (not shown). isu_queue 250 has a variable depth that depends upon the number of instructions grouped therein. isu_queue_ctl 240 contains all isu_queue 250 control logic 241 and instruction retire logic 242. For the purpose of saving power, this instruction retire logic 242 checks for "tight loops." A "tight loop" is defined as a loop that has a maximum of six instructions. A tight loop can and should continue to reside within isu_queue 250 until it has been executed for the last time. This saves power and time by foregoing repeated reloading of the tight loop. As instructions are retired from isu_queue 250, newly decoded instructions in the queue 211 can be written to its empty slots.

The secondary decode logic block isu_2nd_dec 270 provides additional instruction decode logic 271 for the GR, RD, M0 and M1 stages of the pipeline. The main function of the additional instruction decode logic 271 is to provide additional information from each instruction's opcode to isu_group 260. The instruction decoders in isu_2nd_dec 270 are the same as those employed in the additional decode logic 212 of isu_fd_dec 210.

Finally, the dispatch logic block isu_dispatch 280 includes control logic 281, five native opcode staging registers 282, 283, 284, 285, 286 (corresponding to the RD, AG, M0, M1 and EX stages of the pipeline) and logic (not shown) to generate instruction valid signals. isu_dispatch 280 also transmits register addresses for source and destination registers and read enable signals to the BYP 190, the ORF 180, and the ARF 170. Among other things, the control logic 281 uses grouping information and a branch mispredict signal to determine when the staging registers 282, 283, 284, 285, 286 require updating.

Now turning to the specific topic at hand, the present invention is directed to reducing pipeline stalls that would arise in the context of nested calls were accesses to memory required to push and pop PC values. As described in the Background of the Invention, above, accesses to memory are not only time-consuming, but are power-consuming, and should be avoided if possible.

Table 2 is presented for the purpose of demonstrating a pipeline stall by reason of a memory access caused by a nested call.

| Cycle | F/D | GR | RD | AG | M0 | M1 | EX | WB |
|---|---|---|---|---|---|---|---|---|
| n | call0 | g6 | g5 | g4 | g3 | g2 | g1 | g0 |
| | isu_currentpc_fd is updated with address of push instruction | | | | | | | |
| n + 1 | nv | call0 | g6 | g5 | g4 | g3 | g2 | g1 |
| n + 2 | nv | nv | call0 | g6 | g5 | g4 | g3 | g2 |
| n + 3 | nv | nv | nv | call0 | g6 | g5 | g4 | g3 |
| n + 4 | nv | nv | nv | nv | call0 | g6 | g5 | g4 |
| n + 5 | nv | nv | nv | nv | nv | call0 | g6 | g5 |
| n + 6 | nv | nv | nv | nv | nv | nv | call0 | g6 |
| | call0 executed in EX stage of the pipeline. | | | | | | | |
| n + 7 | push | nv | nv | nv | nv | nv | nv | call0 |
| n + 8 | g100 | push | nv | nv | nv | nv | nv | nv |
| | g100 enters pipeline | | | | | | | |

TABLE 2

Prior Art Prefetch and Early Execution of Call Instructions

| Cycle | F/D | GR | RD | AG | M0 | M1 | EX | WB |
|---|---|---|---|---|---|---|---|---|

Code example:

. . .
g0
g1

TABLE 2-continued

Prior Art Prefetch and Early Execution
of Call Instructions

| Cycle | F/D | GR | RD | AG | M0 | M1 | EX | WB |
|---|---|---|---|---|---|---|---|---|
| | g2 | | | | | | | |
| | g3 | | | | | | | |
| | g4 | | | | | | | |
| | g5 | | | | | | | |
| | g6 | | | | | | | |
| | call sub0 | | | | | | | |
| | g7 | | | | | | | |
| | ... | | | | | | | |
| | sub0: | | | | | | | |
| | push %rpc, a0  !save %rpc to memory [a0] | | | | | | | |
| | g100 | | | | | | | |
| | call sub1 | | | | | | | |
| | g102 | | | | | | | |
| | pop %rpc, a0  !retrieve previous %rpc | | | | | | | |
| | ret | | | | | | | |
| | sub1 | | | | | | | |
| | g200 | | | | | | | |
| | g201 | | | | | | | |
| | g202 | | | | | | | |
| | g203 | | | | | | | |
| | g204 | | | | | | | |
| | ret | | | | | | | |

Note:
nv—No valid instructions

The stall begins in cycle n+1, wherein an instruction rendered unavailable and therefore invalid (nv) by reason of a cache miss appears in the F/D stage of the pipeline. The cache miss occurs because the address of the subroutine is not known until the call is executed late in the EX stage of the pipeline. If a cache miss occurs at the time this address is known in cycle n+7, several clock cycles may be required to retrieve the push instruction from the instruction memory into isu_queue 250.

The first nv instruction in cycle n+1, plus five other nv instructions, appear in the pipeline before a valid push instruction finally appears in cycle n+7. (Cycle n+7 assumes that the push instruction has already been prefetched into isu_queue 250; if not, several clock cycles may be required to retrieve the push instruction from the instruction memory.) Six valid instructions that could have entered the pipeline during this time have been delayed.

TABLE 3

Prefetch and Early Execution
of Call Instructions Per Present Invention

| Cycle | F/D | GR | RD | AG | M0 | M1 | EX | WB |
|---|---|---|---|---|---|---|---|---|
| n | call0 | g6 | g5 | g4 | g3 | g2 | g1 | g0 |
| | isu_currentpc_fd is updated with address of push instruction | | | | | | | |
| n + 1 | push | call0 | g6 | g5 | g4 | g3 | g2 | g1 |
| | push is in instruction cache (if not, prefetch can be done in this cycle) | | | | | | | |
| n + 2 | g100 | push | call0 | g6 | g5 | g4 | g3 | g2 |
| n + 3 | call1 | g100 | push | call0 | g6 | g5 | g4 | g3 |
| | isu_currentpc_fd is updated with address of g200 instruction | | | | | | | |
| n + 4 | nv | call1 | g100 | push | call0 | g6 | g5 | g4 |
| | g200 is not in cache, generate prefetch address | | | | | | | |
| n + 5 | nv | nv | call1 | g100 | push | call0 | g6 | g5 |
| | send request to memory | | | | | | | |
| n + 6 | nv | nv | nv | call1 | g100 | push | call0 | g6 |
| | memory access cycle | | | | | | | |
| n + 7 | nv | nv | nv | nv | call1 | g100 | push | call0 |

TABLE 3-continued

Prefetch and Early Execution
of Call Instructions Per Present Invention

| Cycle | F/D | GR | RD | AG | M0 | M1 | EX | WB |
|---|---|---|---|---|---|---|---|---|
| | cache write cycle | | | | | | | |
| n + 8 | g200 | nv | nv | nv | nv | call1 | g100 | push |
| | g200 enters pipeline | | | | | | | |

Code example:
```
...
g0
g1
g2
g3
g4
g5
g6
call sub0
g7
...
sub0:
push    %rpc, a0        !save %rpc to memory [a0]
g100
call sub1
g102
pop     %rpc, a0        !retrieve previous %rpc
ret
sub1
g200
g201
g202
g203
g204
ret
```

Note:
nv—No valid instructions

The example code is exactly the same as in Table 2, but valid instructions g201, g202, g203 and g204 have entered the pipeline by the time the cycle n+8 occurs. Memory access has been avoided, because instruction prefetch can happen earlier (as call1 enters the GR stage of the pipeline). The RPC FIFO queue 233 serves as a very fast memory storage that can provide an address for prefetch every clock cycle. The mechanism and method that bring this result about will now be described in greater detail.

Figure 3:
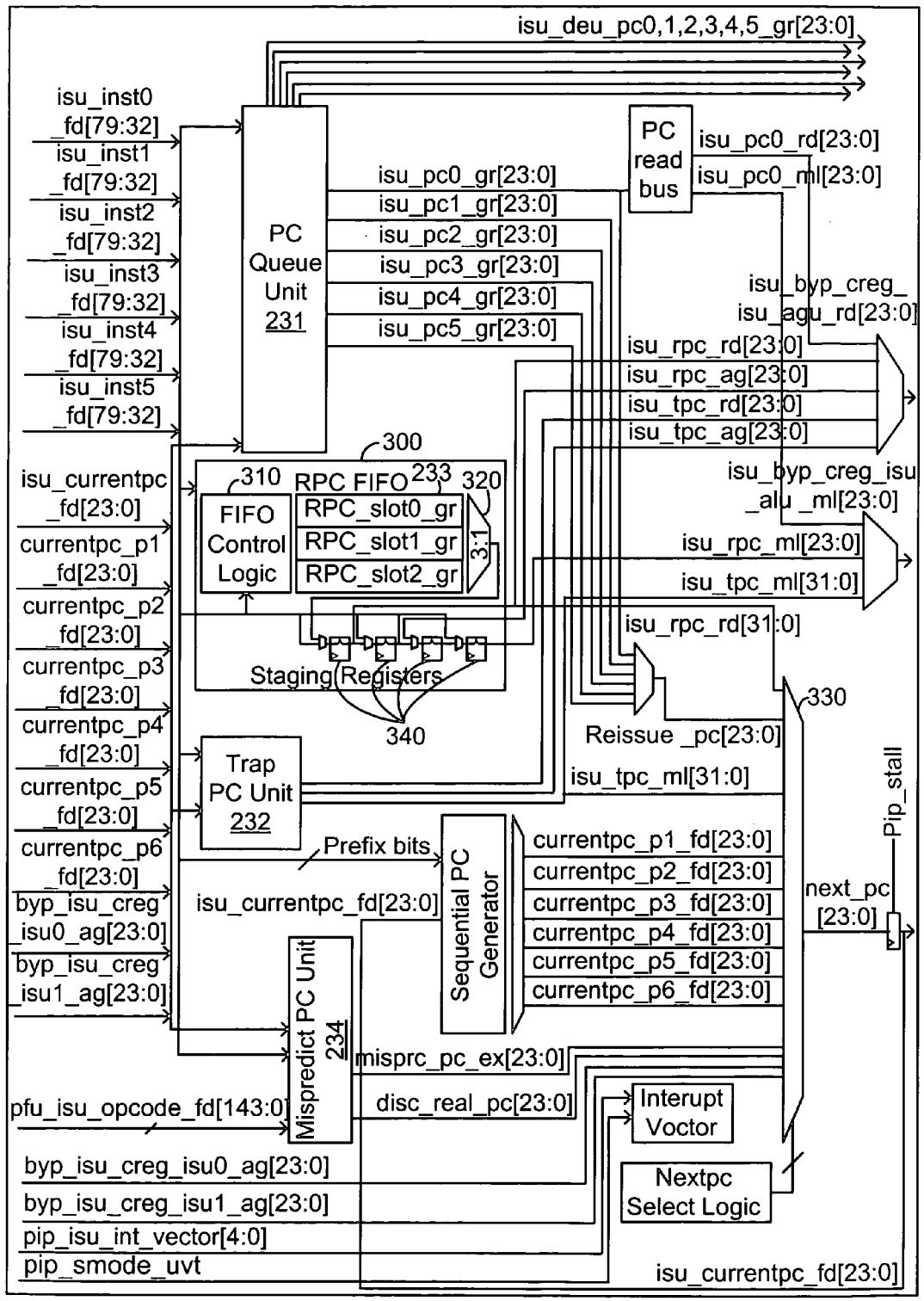
FIG. 3 illustrates the PC controller isu_ctl of FIG. 2, containing a mechanism for reducing pipeline stalls between nested calls constructed according to the principles of the present invention.

Turning now to FIG. 3, illustrated is the PC controller isu_ctl 230 of FIG. 2, containing a mechanism for reducing pipeline stalls between nested calls constructed according to the principles of the present invention.

A return PC unit 300 contains FIFO control logic 310, the return PC FIFO queue 233 and staging registers 340. The FIFO control logic 310 is responsible for controlling the operation of the return PC unit 300 as a whole. The return PC FIFO queue 233 and staging registers 340 cooperate with each other to form return PC storage. The staging registers 340 allow the return PC value to be drawn from the return PC FIFO 233 and to track its corresponding return instruction as it moves through stages in the pipeline.

As described above, each subroutine call has a corresponding return, and subroutines can be nested to any degree. Since the DSP 100 employs prefetching and pipelining, some mechanism should be developed to support prefetching with respect to nested calls. In the illustrated embodiment, that mechanism is embodied in the return PC unit 300, which receives, stores and quickly delivers, at the appropriate time, return PC values to the DSP's PC. In terms of the illustrated embodiment, "quickly" means in a single clock cycle, to avoid stalling the pipeline (as Table 3, above, demonstrated).

Under control of the FIFO control logic 310, a return PC value equaling the current value of the PC, plus one, is loaded into the return PC FIFO queue 233 (by way of a currentpc_pl_fd bus). The current value of the PC is offset by one, because that is the size of the last instruction executed in the main routine (or calling subroutine) before the call instruction routine. (Instructions can be of variable length, e.g., one or two words, or more.) When that value is eventually loaded into the PC (upon execution of a corresponding return instruction), the PC then points to the correct instruction to be executed.

Since the F/D stage of the pipeline of the DSP 100 of FIG. 1 is capable of decoding a maximum of three call instructions prior to grouping in the GR stage, the return PC FIFO queue 233 has three slots. When the return instruction corresponding to a return PC value contained in one of the slots actually enters the pipeline, that slot is selected by way of the multiplexer 320, causing the return PC value to move into the staging registers 340. As the corresponding return instruction moves through the various stages of the pipeline (RD, AG, M0, M1, EX), the return PC value moves through the corresponding RD, AG, M0, M1 and EX staging registers 340.

When the return instruction reaches the F/D stage of the pipeline (both calls and returns are executed early in the illustrated embodiment), the corresponding return PC value in the RD stage of the pipeline is selected by way of a PC multiplexer 330 and is thereby transferred to the PC to effect the return.

Figure 4:
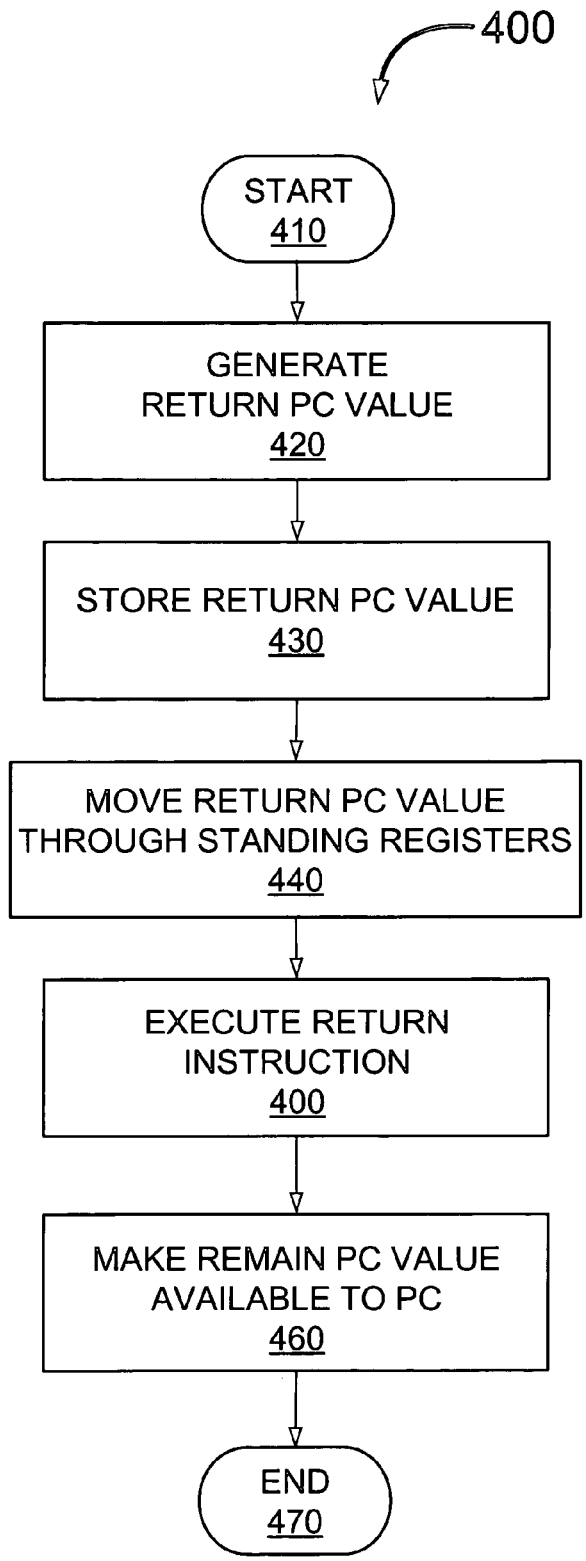
FIG. 4 illustrates a method of reducing pipeline stalls between nested calls constructed according to the principles of the present invention.

Turning now to FIG. 4, illustrated is a method, generally designated 400, of reducing pipeline stalls between nested calls constructed according to the principles of the present invention. The method 400 begins in a start step 410 wherein a call instruction is encountered. In a step 420, a return PC value is generated for each call instruction. In a step 430, the generated return PC value is stored in return PC storage at least until a corresponding return instruction is executed. Until then, the return PC value moves through registers in the return PC storage as the corresponding call instruction moves through corresponding stages in the pipeline in a step 440.

When the return instruction is executed (in a step 450), the return PC value in the RD stage of the pipeline is made available to the PC (in a step 460). The method 400 then ends in an end step 470.

Although the present invention has been described in detail, those skilled in the art should understand that they can make various changes, substitutions and alterations herein without departing from the spirit and scope of the invention in its broadest form.

What is claimed is:

1. For use in a wide-issue pipelined processor, a mechanism for reducing pipeline stalls between nested calls, comprising:
   a program counter (PC) generator configured to generate return PC values for multiple call instructions in a pipeline of said processor; and
   return PC storage, located in an execution core of said processor, coupled to said PC generator and including a PC queue and staging registers, said return PC storage configured to store said return PC values in said PC queue and, upon execution of a corresponding return instruction, make one of said return PC values available to a PC of said processor by employing said staging registers to track said corresponding return instruction while moving through stages in said pipeline.

2. The mechanism as recited in claim 1 wherein said PC generator is associated with an instruction issue unit of said processor.

3. The mechanism as recited in claim 1 wherein said PC generator generates each of said return PC values in a single clock cycle.

4. The mechanism as recited in claim 1 wherein said return PC queue has at least as many slots as a number of call instructions that a fetch/decode stage of said pipeline can decode prior to grouping.

5. The mechanism as recited in claim 1 wherein said return PC storage makes said one of said return PC values available to said PC of said processor as said corresponding return instruction is in an execution stage of said pipeline.

6. The mechanism as recited in claim 1 wherein said call instructions executed in a fetch/decode stage of said pipeline.

7. The mechanism as recited in claim 1 wherein said processor is a digital signal processor.

8. The mechanism as recited in claim 1 further comprising a selector configured to select and move said one of said return PC values from said PC queue to said staging registers upon said execution of said corresponding return instruction to make said one of said return PC values available for said PC.

9. The mechanism as recited in claim 8 where said selector is a multiplexer.

10. For use in a wide-issue pipelined processor, a method of reducing pipeline stalls between nested calls, comprising:
    generating return PC values for call instructions in a pipeline of said processor;
    storing said return PC values in a PC queue of a return PC storage having staging registers and located in an execution core of said processor; and
    making one of said return PC values available to a PC of said processor upon execution of a corresponding return instruction by employing said staging registers to track said corresponding return instruction while moving through stages in said pipeline.

11. The method as recited in claim 10 wherein said generating is carried out in an instruction issue unit of said processor.

12. The method as recited in claim 10 wherein said generating comprises generating each of said return PC values in a single clock cycle.

13. The method as recited in claim 10 wherein said return PC queue has at least as many slots as a number of call instructions that a fetch/decode stage of said pipeline can decode prior to grouping.

14. The method as recited in claim 10 wherein said return PC storage makes said one of said return PC values available to said PC of said processor as said corresponding return instruction is in an execution stage of said pipeline.

15. The method as recited in claim 10 further comprising executing said call instructions in a fetch/decode stage of said pipeline.

16. The method as recited in claim 10 wherein said processor is a digital signal processor.

17. A digital signal processor, comprising:
    a pipeline having stages capable of executing call instructions;
    a wide-issue instruction issue unit;
    a program counter (PC) generator configured to return PC values for multiple call instructions in a pipeline of said processor; and
    return PC storage, located in an execution core of said processor, coupled to said PC generator and including a PC queue and staging registers, said return PC storage configured to store said return PC values in said PC queue and, upon execution of a corresponding return instruction, make one of said return PC values available to a PC of said processor by employing said staging registers to track said corresponding return instruction while moving through stages in said pipeline.

18. The DSP as recited in claim 17 wherein said PC generator is associated with an instruction issue unit of said DSP.

19. The DSP as recited in claim 17 wherein said PC generator generates each of said return PC values in a single clock cycle.

20. The DSP as recited in claim 17 wherein said return PC queue has at least as many slots as a number of call instructions that a fetch/decode stage of said pipeline can decode prior to grouping.

21. The DSP as recited in claim 17 wherein said return PC storage makes said one of said return PC values available to said PC of said processor as said corresponding return instruction is in an execution stage of said pipeline.

22. The DSP as recited in claim 17 wherein said call instructions are executed in a fetch/decode stage of said pipeline.

* * * * *